United States Patent
Chitsazan et al.

(10) Patent No.: US 6,801,014 B1
(45) Date of Patent: Oct. 5, 2004

(54) BATTERY EQUALIZER USING TOTAL STRING CURRENT

(75) Inventors: Ehsan Chitsazan, Cumming, GA (US); Doug Westrom, Atlanta, GA (US); Joey Goodroe, Dacula, GA (US); John Gary Batson, Duluth, GA (US)

(73) Assignee: ARRIS International, Inc., Suwanee, GA (US)

( * ) Notice: Subject to any disclaimer, the term of this patent is extended or adjusted under 35 U.S.C. 154(b) by 76 days.

(21) Appl. No.: 10/141,045

(22) Filed: May 8, 2002

Related U.S. Application Data
(60) Provisional application No. 60/289,574, filed on May 8, 2001.

(51) Int. Cl.[7] .................................................. H02J 7/00
(52) U.S. Cl. ..................................................... 320/119
(58) Field of Search ............................... 320/119, 160, 320/DIG. 22

(56) References Cited

U.S. PATENT DOCUMENTS

| | | | | |
|---|---|---|---|---|
| 5,646,504 A | * | 7/1997 | Feldstein | 320/119 |
| 5,659,237 A | * | 8/1997 | Divan et al. | 320/119 |
| 6,150,795 A | * | 11/2000 | Kutkut et al. | 320/118 |

* cited by examiner

*Primary Examiner*—Pia Tibbits

(57) ABSTRACT

A method and system for equalizing the voltage of batteries in a battery string to a desired voltage. An equal string current is drawn from the batteries of the battery string and redistributed as a plurality of secondary currents to each battery depending upon the comparative voltage of the individual batteries. A larger secondary current is provided to batteries having a low voltage and a smaller secondary current is provided to batteries having a high voltage. A transformer is provided electrically connected to the battery string having an input winding connected to the battery string such that it receives an equal string current from each battery. The transformer has a plurality of output windings having an equal turn ratio, each output winding in parallel with a battery of the battery string, to provide a secondary charging current to a battery in the battery string.

20 Claims, 5 Drawing Sheets

BATTERY EQUALIZER USING TOTAL STRING CURRENT

CROSS-REFERENCE TO RELATED APPLICATION

This application claims the benefit of U.S. Provisional Patent Application Ser. No. 60/289,574 filed May 8, 2001, entitled "SWITCHING LEAD-ACID BATTERY EQUALIZER."

TECHNICAL FIELD

The present invention relates to battery charger circuits and, more specifically, to a battery voltage equalizer for equalizing the voltage across each of a plurality of series connected charging batteries.

BACKGROUND OF THE INVENTION

In order to obtain optimum life from lead-acid batteries, the batteries must be correctly charged. When a single charger is used to charge a string of batteries in series, it is unlikely that all of the batteries will receive proper charging, even if all of the batteries are brand new. As a result, some batteries may receive insufficient charge while others receive excess charge. Both of these conditions cause the premature failure of the batteries.

Typically, in series battery string applications, the charger monitors total string voltage rather than individual battery voltages. Because the total string voltage is the sum of the ideal individual battery charging voltages, one battery may receive insufficient charge while another is overcharged. Both overcharging and undercharging, caused by high and low float voltages respectively, damage the batteries and decrease the battery's life. Overcharging produces excessive heat that can cause the battery plates within the cells to buckle and shed their active material. Undercharging causes buildup of unwanted chemicals on the battery plates, reducing the battery's capacity and effective life. Unlike NiCad batteries, lead-acid batteries require constant charging with a float voltage level specified by the manufacturer. To prevent damage to the batteries, battery manufacturers typically recommend a charging voltage between 13.25 to 13.65 Volts at 25° C. during initial charging. However, except in the case of single-battery applications, this recommendation is rarely observed. To complicate matters, the requirements for a given battery also vary with temperature. For example, MK batteries recommend −16.2 mV adjustment to the float voltage for one ° C. temperature change.

In a conventional battery charging circuit, a battery charger may be connected in series with a plurality of batteries. For example, as shown in FIG. 1, utilizing three batteries, battery A, battery B, and battery C, 110, 120, 130 connected in series with a battery charger 105. In this example, a 41.1 V battery charger 105 is intended to provide a float voltage of 13.7 V on each battery A, B, and C. When the charging cycle starts, a charge current is supplied to all of the discharged batteries in series. In constant voltage charging, the total string voltage is monitored to determine if all of the batteries have reached the required float voltage. In this example, the required float voltage for each battery is 13.7 V. The charging circuit will operate in float mode when total battery string voltage is 41.1 V (3*13.7V). However, if the batteries have uneven float voltages, as is nearly always the case, then the batteries will not receive the proper charge. For example, battery A may have a float voltage of 13.9 V while battery B has a float voltage of 13.5 V, and battery C has a float voltage of 13.7 V. The total string voltage is still 41.1V, but only battery C is being properly charged. In this example, battery A is being overcharged and battery B is not receiving adequate charge. Overcharging produces excessive heat which can damage the battery. Undercharging causes unwanted chemical buildup. Both of these problems reduce the life of the battery.

The float voltage is the voltage across a battery 110, 120, 130 while the battery 110, 120, 130 is charging in float mode or trickle mode. A typical battery charger 105 switches from normal charging mode to float mode or trickle mode once the charging battery or batteries 110, 120, 130 reach a full charge. In many systems, the typical operating mode is float mode or trickle mode. This is especially true for systems in which the batteries are used for backup power. In such systems, the batteries are fully charged except at initial start-up and following an interruption in the primary power source. In systems where the batteries are used to provide backup power, it is important that the batteries remain in a state of full charge so that the batteries are ready to provide power to the system until the main power supply is restored.

Typically, during the initial charging of a series of batteries to float mode as discussed above, a relatively large constant charging current is applied to the battery string for a relatively short period of time. For example, a charger may supply 10 amps of current for three hours to charge the battery string and reach float mode. Once the charger reaches float mode i.e., the desired string voltage is achieved, such as the 41.1 V string voltage in the example above, a large charging current is no longer needed. However, a small charging current, such as 0.6 amps, is typically applied in float mode to keep the batteries fresh and charged. Unlike the short time period of initial charging, however, the batteries may be charged in float mode for extended time periods such as several months or even years. During this extended time period the individual voltages of the batteries tend to vary, with some battery voltages moving higher than the desired float voltage and some voltages moving lower than the desired float voltage. This may occur even if the individual batteries are initially charged to their desired voltage. These voltage variances, even if not large, may damage the batteries over the extended time period.

Therefore, there is a need in the art for a system and method for charging each of a plurality of batteries in a battery string to a desired voltage which is simple and energy efficient and which does not require the monitoring of individual battery voltages.

SUMMARY OF THE INVENTION

The present invention overcomes the above-described problems in the prior art by providing a system and method for charging a plurality of batteries in series to a desired voltage. The present invention also provides a system and method for equalizing the voltage of series connected batteries.

The method and system of the present invention is for use with a plurality of series connected batteries. In the present invention, an equal string current is drawn from each battery of the battery string and redistributed to the batteries by a plurality of secondary charging currents based upon each battery's comparative voltage. Thus, the size of the secondary current provided to a particular battery varies inversely to the battery's comparative voltage, such that batteries with a lower voltage are provided with a larger secondary current and batteries with a higher voltage batteries are provided with a smaller secondary current. In this way, the voltages of the batteries are equalized. The total string voltage may be regulated by a charger to ensure that the total string voltage is maintained at a target voltage that is equal to the sum of the desired voltage of the plurality of batteries. Thus, as the total string voltage is maintained at the target voltage, the string current is redistributed unequally to the batteries such that the battery voltages become equalized at the same desired voltage. Other objects, features, and advantages of the present invention will become apparent upon reading the following detailed description of the embodiments of the invention, when taken in conjunction with the accompanying drawings and appended claims. dr

DETAILED DESCRIPTION

Figure 1:
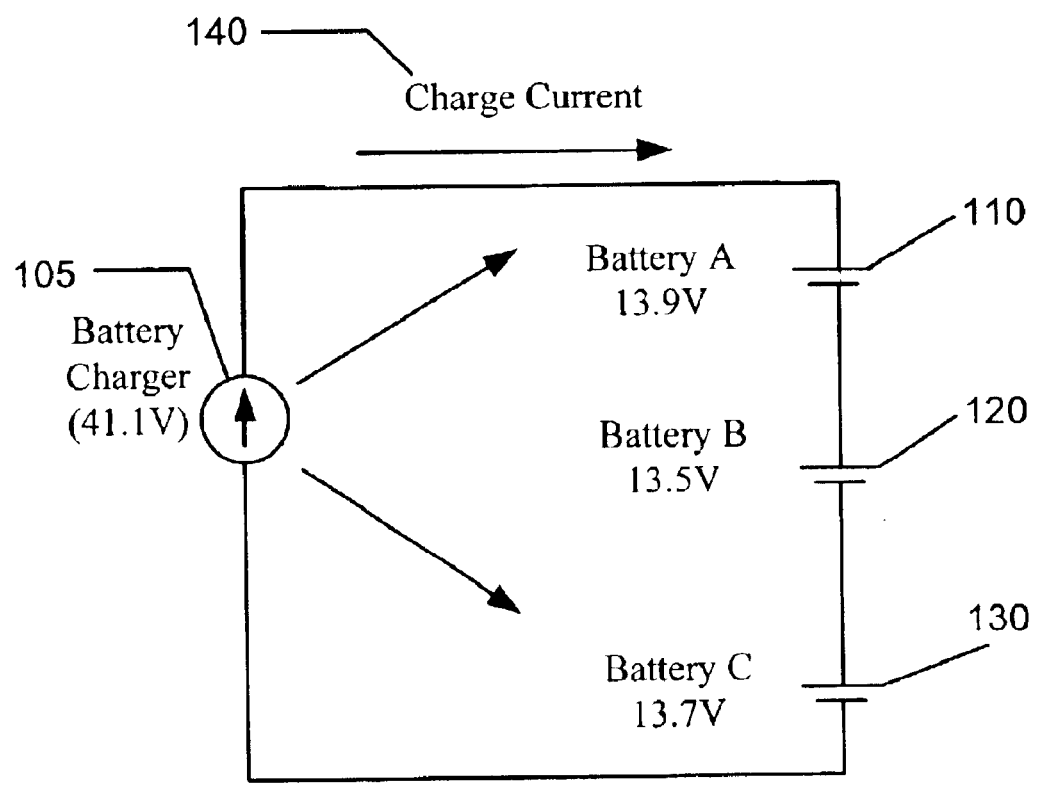
FIG. 1 is a block diagram of a prior art charger.

The system of the present invention is for use with a plurality of series connected batteries. In the present invention, an equal string current is drawn from each battery of the string and redistributed unequally to each of the batteries as a plurality of secondary charging current based upon the comparative voltage of each individual battery, such that batteries with a lower voltage receive a larger secondary current and batteries with a higher voltage receive a smaller secondary current. In this way, each of the batteries is brought to the same voltage. By regulating the string voltage to a target voltage, each individual battery will approach a desired voltage.

The present invention provides a method for equalizing the voltage of batteries in a battery string to a desired voltage by providing a transformer electrically connected to the battery string. An equal string current is drawn from each battery of the battery string and provided to the transformer. The transformer provides a secondary current to each battery of the string inversely to the battery voltage, with batteries at a lower comparative voltage receiving more current than batteries at a higher comparative voltage.

In a preferred embodiment, the transformer has a primary winding, or coil, which is connected to the battery string such that it receives a string current drawn from each of the batteries. The string current induces a voltage in the primary winding, thereby creating a magnetic field in the transformer core.

The transformer has a plurality of secondary, or output, windings or coils connected to an output circuit, such that each output winding is in parallel relationship with a battery of the battery string. In a preferred embodiment, each output winding has the same turn ratio. Thus, when the transformer induces an output voltage in the output windings, the same voltage is induced in each of the windings because each has the same turn ratio. A secondary current is created in each output circuit to charge the respective battery in the particular output circuit. Because each output winding is parallel with its respective battery, the amount of current generated in a particular output circuit to charge the battery is dependent upon the voltage needs of the battery. Thus, each battery receives an amount of current in accordance with its needs based upon the comparative voltages of the other batteries in the string. In this way, the voltage of all of the batteries in the string are moved to the same voltage as current is redistributed from batteries at a higher voltage to batteries at a lower voltage.

In a preferred embodiment, a flyback transformer is used. A flyback transformer stores energy when the transformer is "on" and releases the stored energy to the output windings when the transformer is turned "off." Such a flyback transformer may be arranged by controlling the polarity of the input and output windings and the direction of current flow, such as by the use of diodes, and by other means known in the art Additional features may also be added to the system such as various switches, voltage monitors and regulators, current peak limiters, voltage regulators, dividers, etc. Furthermore, in addition to being used in conjunction with a plurality of series connected batteries, the present invention may be used with a single charging battery to achieve the same results.

Referring now to the drawings, in which like numerals refer to like parts throughout the several views, exemplary embodiments of the present invention are described in more detail.

Although the system will be described in terms of equalizing battery voltages during trickle or float mode when the charging current is relatively small, it will be recognized that the invention may also be used for initial charging of the battery.

Figure 2:
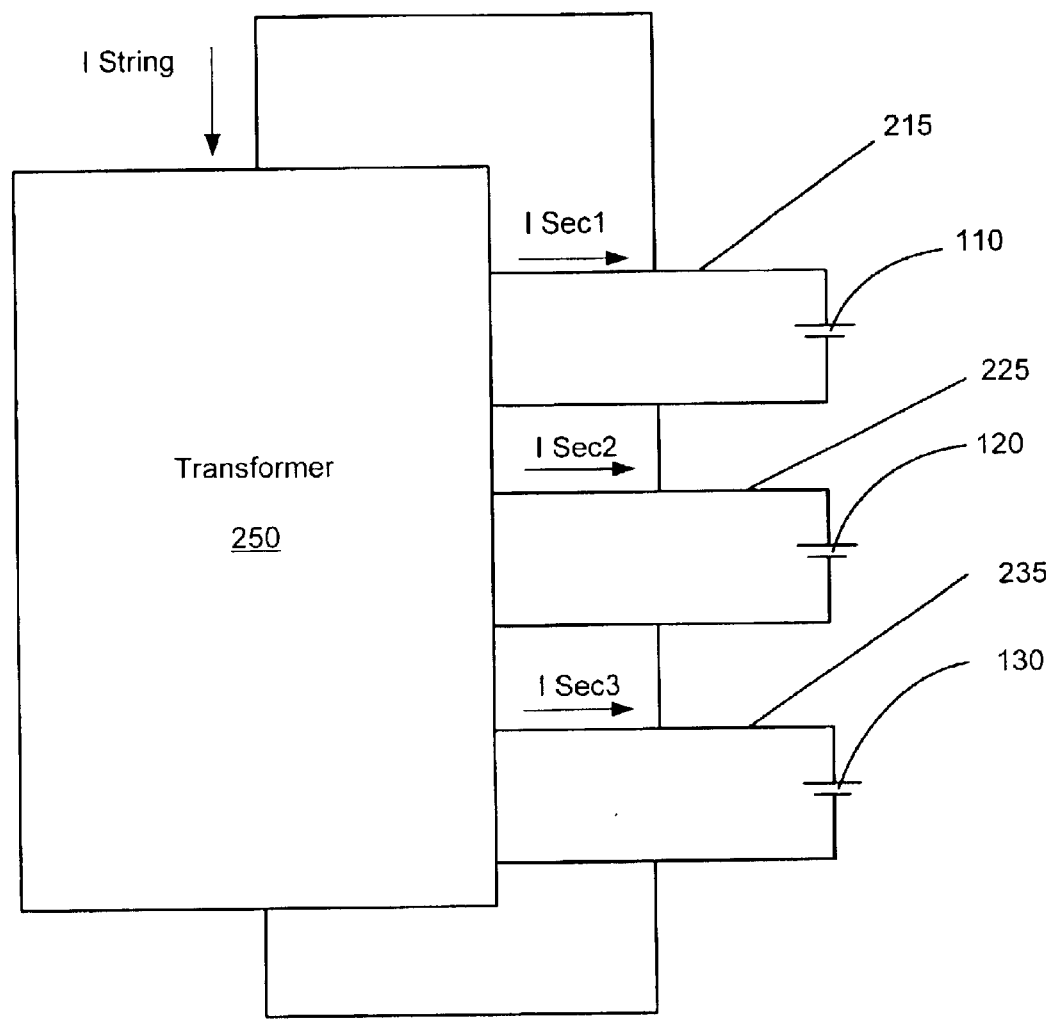
FIG. 2 is a block diagram of an exemplary embodiment of the present invention.

FIG. 2 shows a schematic diagram of a transformer 250 connected across a battery string. The transformer draws a string current I String from the batteries 110, 120, 130. The transformer provides a plurality of secondary current I Sec1, I Sec2, I Sec3 to charge the individual batteries through output circuits 215, 225, 235.

Figure 3:
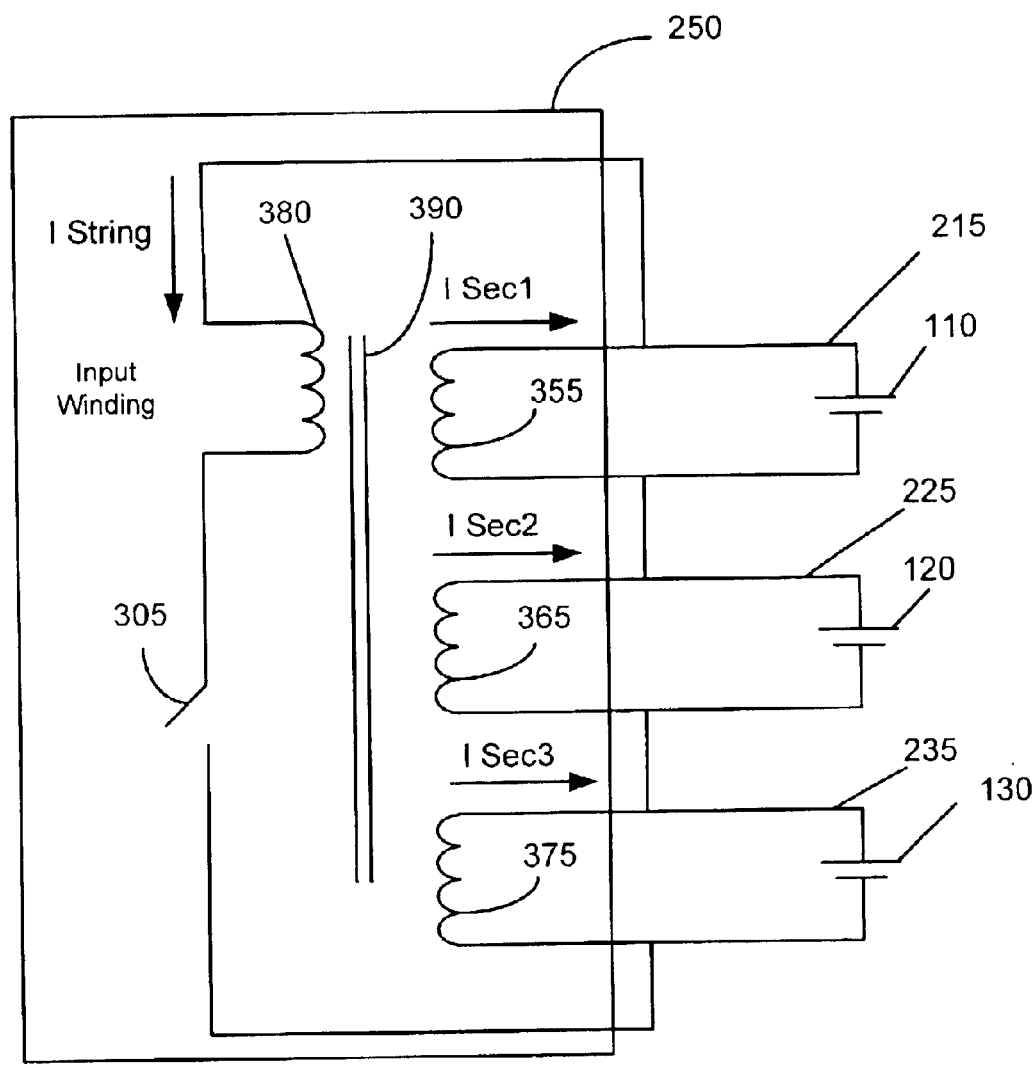
FIG. 3 is a schematic diagram of an exemplary embodiment of a present invention.

FIG. 3 is an illustration of an exemplary embodiment of the present invention. FIG. 3 shows a battery charging circuit including series connected batteries 110, 120, 130 connected with transformer 250 (shown in dotted line). As shown in FIG. 3, a plurality of output windings of the transformer, 355, 365, 375 are connected in parallel with each charging battery in an output circuit 215, 225, 235.

An input winding 380 of the transformer 250 is attached across the battery string such that it receives a string current I String. A voltage is thereby created in the input winding 380 and a magnetic field is created in the transformer core 390. A secondary voltage is induced by the electromagnetic field of the core 390 to each of the output windings 355, 365, 375 of the output circuits 115, 125, 135.

Figure 4:
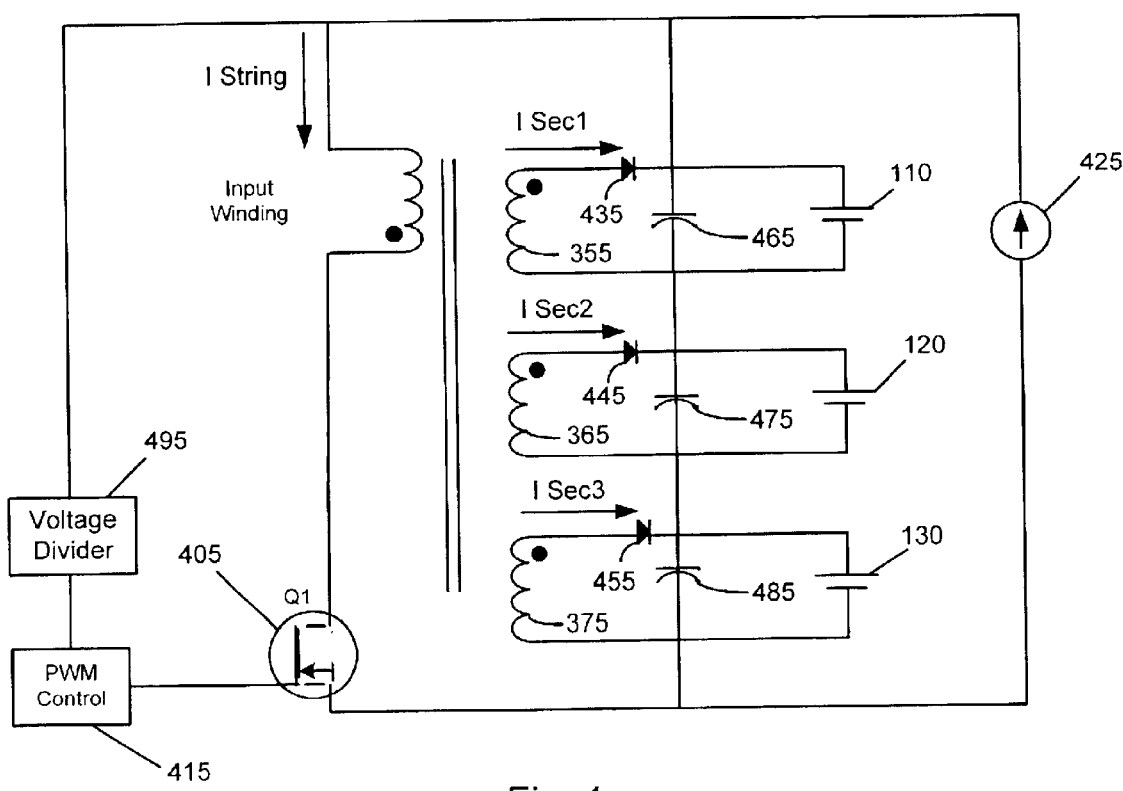
FIG. 4 is a schematic diagram of exemplary embodiment of the present invention in an exemplary operating environment.

In a preferred embodiment, the turn ratio of each of the output windings is the same and therefore the same voltage is created in each output winding. A secondary current I Sec is created in the output circuits 115, 125, 135 to charge each respective battery according to its needs. As shown in FIG. 4, in a preferred embodiment, a flyback transformer is used. Thus, the transformer is turned "on" and "off" to store and release energy by a switch 405. When the transformer is "on," current is fed into the input winding 380. Due to the opposite polarity of the input and output windings, and the direction of diodes 435, 445, 455 which prevent the flow of an induced current, the transformer does not induce a voltage in the secondary winding and current does not flow from the transformer to the output windings when the transformer is "on", but the energy is stored in the transformer core 390 as an electromagnetic field. When the transformer is turned "off," a voltage is induced in the output windings 355, 365, 375 and a secondary charging current I Sec1, I Sec2, I Sec3, flows from the output windings through the output circuits 215, 225, 235 to charge the respective battery 110, 120, 130.

The amount of current provided to each battery 110, 120, 130 is dependent upon the voltage needs of the battery. Thus, although the present system draws the same string current I String from each of the batteries 110, 120, 130 equally, it provides a secondary charging current I Sec to the batteries which varies depending upon the charging needs of the battery. The output windings 355, 365, 375, being in parallel relationship to the batteries 110, 120, 130 create a secondary current I Sec in the output circuits 115, 125, 135 to charge the respective battery in accordance with its comparative voltage to the other batteries, such that a battery at 1 lower voltage will receive a larger secondary current than a battery at a higher comparative voltage.

By way of example, assume the desired float voltage of each of the batteries 110, 120, and 130 is 13.7 volts, and the float voltage of one battery 110 is 13.1 V. When the transformer 150 is "on," the voltage of the output winding 355 is also 13.1 V because it is in parallel with the battery and, due to the nature of a flyback transformer, the transformer does not induce a voltage while "on" but stores the energy in the transformer core. When the transformer is turned "off" a voltage is induced in the output winding from the energy stored in the transformer and a secondary current flows to charge the battery. For example, if a voltage of 13.7 V is induced in the output winding 355, a secondary current will flow from the output winding through the output circuit 215 to charge the battery which is at a lower voltage (13.1V).

If the voltage of a particular battery is higher than the voltage of another battery in the string, then that particular battery will receive less current than the other battery. On the other hand, if the voltage of a particular battery is less than another battery in the string, then that particular battery will receive more current than the other battery. For example, if the voltage of a battery 120 is 14.1 V, then the transformer will provide less current to that battery than a battery 110 having a lower comparative voltage of 13.1 V. By way of example only, if the string current draws 1 amp from each battery in the example above, the transformer will supply a larger secondary current I Sec1, such as 1.5 amps, to the battery 110 at the lower voltage (13.1 V) and a smaller secondary current I Sec2, such as 0.5 amps, to the battery 120 at the higher voltage (14.1 V). In this way, the system of the present invention redistributes the string current drawn equally from each battery to the batteries based upon each battery's individual voltage. As this process continues as the transformer is repeatedly turned "on" and "off", the voltages of the batteries begin to equalize and approach the desired voltage.

As shown in FIG. 4, the transformer may be turned on and off by switch 405 as is known in the art. In addition, the current of the system may be regulated and controlled by various means, such as by a PWM controller 415. As shown in FIG. 4, capacitors 465, 475, 485 may be used for further controlling the voltage and storing charge. As also shown in FIG. 4, a charger 425 may be used to provide a charging current to the battery string. The charger 425 regulates the battery string voltage to ensure that it is at a target voltage. For example, if the desired charge for three batteries in a string is 13.7 V for each battery, the charger may be used to ensure the string voltage is 41.1 V.

The charger 425 may supply a charging current during float mode or initial charging. In a typical use of the invention, a plurality of battery voltage output circuits may be used to ensure that each battery of the string is charged to an equal voltage. A voltage divider 495 may be used to adjust the voltage. However, Applicant has found that a voltage divider is unnecessary where the charger 425 is used to ensure that the string voltage is correct. However, a voltage divider may be useful during the initial charging of the batteries where large currents are used.

By drawing an equal string current from all string batteries and providing a secondary charging current to the batteries, in accordance the voltage needs of each individual battery, the system equalizes the voltage of the batteries. The battery charger 425 regulates the total voltage across the series combination of the batteries. Because each battery 110, 120, 130 will be provided current in proportion to its needs, the batteries' voltages are equalized and they approach their desired voltage. In an exemplary embodiment of the present invention, the turn ratio of each output winding is the same.

It will be obvious to one of skill in the art that the present invention is not dependent upon the number of batteries in the string. Those skilled in the art will understand that the schematic of FIG. 4 is one implementation of the present invention and that numerous alternative implementations are available. Those skilled in the art will understand that the exact component values may need to be adjusted depending on the particular batteries being charged and the magnitude of the voltages and currents required and whether the system is used with initial charging, trickle mode, or both.

Figure 5:
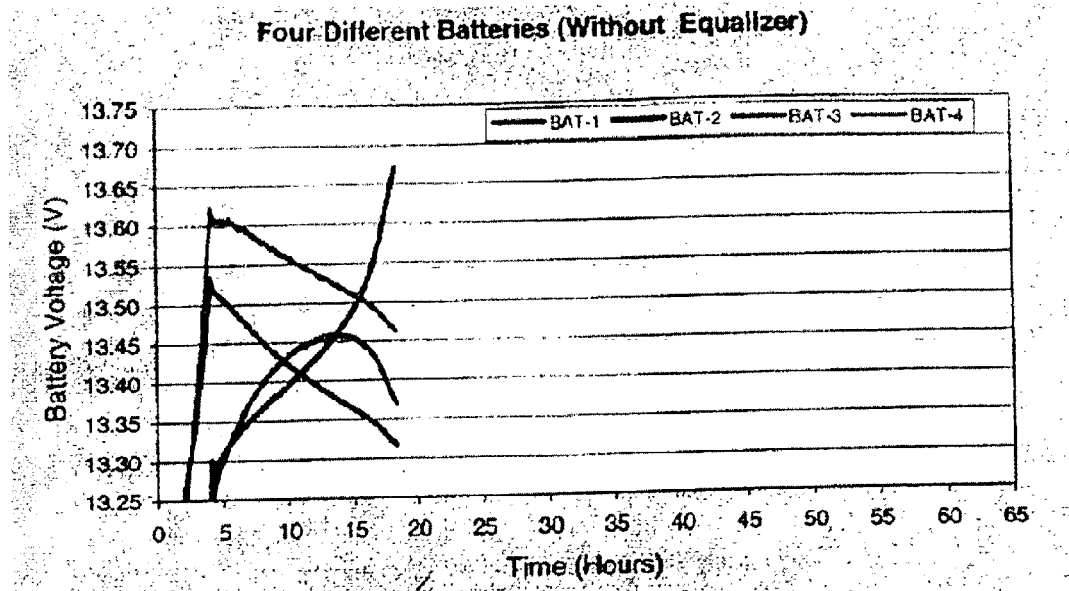
FIG. 5 is a plot of the voltage values of four batteries in float mode over time without the system of the present invention.

Battery manufacturers typically recommend a float voltage range of ±0.1 V of the recommended float voltage. FIG. 5 shows a plot of the float voltage values of four batteries in float mode over time without the equalizer system of the present invention. As can be seen, within a few hours the float voltages of the batteries have diverged by significantly more than ±0.1 V.

Figure 6:
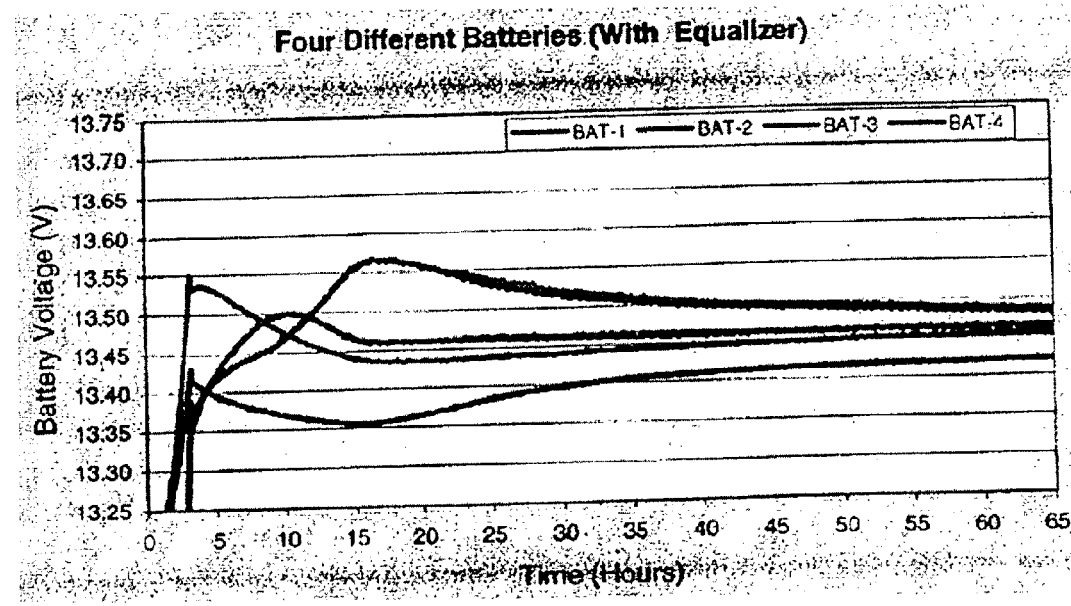
FIG. 6 is a plot of the voltage values of four batteries in float mode over time using the system of the present invention.

FIG. 6 shows a plot of the voltage values of four batteries in float mode over time using the method and system of the present invention. As can be seen, the voltages of the batteries converge to within ±0.1V.

Alternate embodiments of the invention will become apparent to those skilled in the art to which the present invention pertains without departing from its spirit and scope. Accordingly, the scope of the present invention is described by the appended claims and supported by the forgoing description.

What is claimed is:

1. A method for charging a plurality of batteries in a battery string to a desired voltage, comprising the steps of:
    drawing an equal string current from each of the plurality of batteries; and
    redistributing the string current by providing a plurality of secondary charging currents to each of the plurality of batteries, wherein the size of the secondary current applied to a particular battery is inverse to the size of the voltage of the particular battery.

2. The method of claim 1 further comprising the step of regulating a string voltage of the battery string to a target voltage.

3. The method of claim 2 wherein the target voltage is equal to the sum of the desired voltage of the plurality of batteries.

4. The method of claim 1 wherein the step of redistributing the string current by providing a plurality of secondary charging currents to each of the plurality of batteries, wherein the size of the secondary current applied to a particular battery is inverse to the size of the voltage of the particular battery, comprises the step of providing a larger secondary current to batteries at a lower voltage than batteries at a comparatively higher voltage.

5. A method for equalizing the voltage of batteries in a battery string to a desired voltage, comprising the steps of:
   providing a transformer electrically connected to the battery string;
   drawing an equal string current from the battery string;
   providing the string current to the transformer; and
   utilizing the transformer to provide a secondary current to each of the plurality of batteries, wherein the size of the secondary current provided to a particular battery is inverse to the size of the voltage of the particular battery.

6. The method of claim 5 wherein the step of providing the string current to the transformer comprises the step of providing the string current to an input winding of the transformer.

7. The method of claim 5 wherein the step of utilizing the transformer to provide a secondary current to each of the plurality of batteries, comprises the step of inducing an output voltage in a plurality of output windings of the transformer, wherein each output winding of the plurality of output windings is parallel to one of the batteries of the battery string in an output circuit, such that the secondary current is induced to charge the battery in the output circuit.

8. The method of claim 5 further comprising the step of regulating a string voltage to a target voltage.

9. The method of claim 8 wherein the target voltage is equal to the sum of the desired voltage of the plurality of batteries.

10. A method for equalizing the voltage of a plurality of batteries of a battery string, comprising the steps of:
   drawing an equal string current from each of the plurality of batteries;
   providing the string current to an input winding of a transformer;
   inducing a voltage in the input winding of the transformer;
   inducing an output voltage in a plurality of output windings of the transformer, wherein the output windings are connected in parallel with each of the plurality of batteries; and
   providing a secondary current from the output winding in each output circuit to each of the plurality of batteries, wherein the size of the secondary current provided to each battery is inverse to the size of the voltage of the battery.

11. The method of claim 10 further comprising the step of applying a charging current to the battery string from a charger such that a string voltage of the battery string is equal to a target voltage.

12. The method of claim 11 wherein the target voltage is equal to the sum of the desired voltage of the plurality of batteries.

13. A battery equalizer for equalizing the charge of a plurality of batteries in a battery string, comprising:
   an input winding of a transformer in connection with the battery string so as to receive an equal string current from each of the plurality of batteries of the battery string;
   a plurality of output windings, each of the output windings in parallel connection in an output circuit with each of the batteries, wherein a turn ratio of each of the output windings is equivalent.

14. The battery equalizer of claim 13 further comprising a current regulator, for regulating the string current received by the input winding.

15. The battery equalizer of claim 13 wherein the transformer is a fly back transformer.

16. The battery equalizer of claim 13 further comprising a charger for providing a charging current to the battery string.

17. The battery equalizer of claim 16 wherein the charger regulates the string voltage of the battery string to a target voltage.

18. The battery equalizer of claim 17 wherein the target voltage is equal to the sum of the desired voltage of the plurality of batteries.

19. A system for charging a plurality of batteries, to a desired voltage comprising:
   a plurality of batteries connected in a battery string;
   an input winding of a flyback transformer connected to the battery string, such that a string current flows through the input winding; and
   a plurality of output windings of the transformer, each of the output windings connected in parallel to one of the plurality of batteries in an output circuit, wherein the turn ratios of the output windings are equal; and
   a charger for regulating a charging current to the battery string such that the battery string is at a target voltage.

20. The system of claim 19 wherein the target voltage is equal to the sum of the desired voltage of the plurality of batteries.

* * * * *